(12) United States Patent
Miller et al.

(10) Patent No.: US 10,436,151 B2
(45) Date of Patent: Oct. 8, 2019

(54) MODULAR FAN FOR A GAS TURBINE ENGINE

(71) Applicant: General Electric Company, Schenectady, NY (US)

(72) Inventors: Brandon Wayne Miller, Liberty Township, OH (US); Randy M. Vondrell, Cincinnati, OH (US); Darek Tomasz Zatorski, Fort Wright, KY (US); Daniel Alan Niergarth, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 667 days.

(21) Appl. No.: 14/943,058

(22) Filed: Nov. 17, 2015

(65) Prior Publication Data

US 2017/0138307 A1 May 18, 2017

(51) Int. Cl.
*F02K 3/06* (2006.01)
*F02C 3/04* (2006.01)
*F02C 7/36* (2006.01)
*F01D 5/06* (2006.01)

(52) U.S. Cl.
CPC .............. *F02K 3/06* (2013.01); *F01D 5/066* (2013.01); *F02C 3/04* (2013.01); *F02C 7/36* (2013.01); *F05D 2220/32* (2013.01); *F05D 2220/36* (2013.01); *F05D 2230/51* (2013.01); *Y02T 50/673* (2013.01)

(58) Field of Classification Search
CPC ... F02K 3/06; F01D 5/026; F01D 5/06; F01D 5/066; F02C 7/36
See application file for complete search history.

(56) References Cited

U.S. PATENT DOCUMENTS

| 3,489,338 | A | * | 1/1970 | Davies | F01D 7/00 416/157 R |
| 3,720,060 | A | * | 3/1973 | Davies | F01D 7/00 415/129 |
| 4,887,949 | A | | 12/1989 | Dimmick, III et al. | |
| 4,934,140 | A | | 6/1990 | Dennison et al. | |
| 7,874,163 | B2 | | 1/2011 | Merry et al. | |

(Continued)

FOREIGN PATENT DOCUMENTS

EP 1 672 172 A1 6/2006
JP 2001-342993 A 12/2001

OTHER PUBLICATIONS

Office Action issued in connection with corresponding CA Application No. 2948246 dated Oct. 16, 2017.

(Continued)

*Primary Examiner* — Arun Goyal
(74) *Attorney, Agent, or Firm* — Dority & Manning, P.A.

(57) ABSTRACT

A gas turbine engine includes a core and a tie shaft. The tie shaft is rotatable about an axial direction of the gas turbine engine by the core of the gas turbine engine. The gas turbine engine additionally includes a modular fan having a plurality of fan blades and a frame. The plurality fan blades are attached to the frame and the frame is slidably received on the tie shaft of the gas turbine engine. The modular fan additionally includes an attachment member removably attaching the frame to the tie shaft of the gas turbine engine to removably install the modular fan in the gas turbine engine.

19 Claims, 5 Drawing Sheets

(56) References Cited

U.S. PATENT DOCUMENTS

| | | |
|---|---|---|
| 8,579,538 B2 | 11/2013 | Juh et al. |
| 8,821,029 B2 | 9/2014 | Antunes et al. |
| 2013/0163911 A1 | 6/2013 | Antunes et al. |
| 2014/0023505 A1 | 1/2014 | Curlier et al. |
| 2014/0193253 A1 | 7/2014 | Carvalho |
| 2014/0331496 A1 | 11/2014 | West |
| 2015/0068367 A1 | 3/2015 | Tailpied |
| 2015/0078915 A1 | 3/2015 | Wasserman et al. |
| 2015/0143794 A1 | 5/2015 | Schwarz et al. |
| 2015/0226116 A1 | 8/2015 | Major et al. |
| 2016/0160875 A1* | 6/2016 | Schwarz ................. F01D 11/22 415/124.1 |

OTHER PUBLICATIONS

First Office Action and Search issued in connection with corresponding CN Application No. 201611012366.6 dated Dec. 1, 2017.

Extended European Search Report and Opinion issued in connection with corresponding EP Application No. 16198586.6 dated Mar. 15, 2017.

Machine Translation of Second Office Action and Search issued in connection with corresponding CN Application No. 201611012366.6 dated Jul. 31, 2018.

* cited by examiner

MODULAR FAN FOR A GAS TURBINE ENGINE

FIELD OF THE INVENTION

The present subject matter relates generally to a fan for a gas turbine engine, or more particularly to a modular fan for a gas turbine engine.

BACKGROUND OF THE INVENTION

A gas turbine engine generally includes a fan and a core arranged in flow communication with one another. In operation, at least a portion of the air over the fan is provided to an inlet of the core. Such portion of the air is progressively compressed by one or more compressors until it reaches a combustion section, wherein fuel is mixed with the compressed air and burned to provide combustion gases. The combustion gases are routed through one or more turbines, driving the one or more turbines. The one or more turbines may, in turn, drive the one or more compressors via respective shaft(s). The combustion gases are then routed through an exhaust section, e.g., to atmosphere.

In addition to driving the one or more compressors, the shaft(s) can additionally drive a fan, e.g., through a gearbox. The gearbox allows the shaft(s) to be rotated at a higher speed relative to the fan for greater efficiency. Fans of certain gas turbine engines additionally include various components for further increasing an efficiency. For example, certain fans include a pitch change mechanism operable with a plurality of fan blades of the fan to change a pitch of each of the plurality of fan blades. Additionally, one or more fan counterweights may be provided to ensure balanced rotation of the fan during operation.

It can be difficult to install each of these various components of the fan, and further it can be difficult to maintain each of these individual components of the fan. For example, in certain gas turbine engines, each of these components are installed individually and bolted to one or more structural members from an aft end. In order to reach such components for, e.g., maintenance or repair, all of the components positioned around or forward of such component must also be removed.

Accordingly, a gas turbine engine having a fan that may be installed and/or removed more efficiently and with greater ease would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided. The gas turbine engine defines an axial direction and includes a core, a tie shaft rotatable about the axial direction by the core, and a modular fan. The modular fan includes a plurality of fan blades and a frame. The plurality of fan blades are attached to the frame and the frame is slidably received on the tie shaft of the gas turbine engine. The modular fan additionally includes an attachment member removably attaching the frame of the modular fan to the tie shaft of the gas turbine engine to removably install the modular fan in the gas turbine engine.

In another exemplary embodiment of the present disclosure, a modular fan for a gas turbine engine defining an axial direction is provided. The gas turbine engine includes a core and a tie shaft, the tie shaft rotatable about the axial direction by the core. The modular fan includes a plurality of fan blades and a disk. The plurality of fan blades are attached to the disk. The modular fan additionally includes a frame. The disk is attached to or integrated into the frame. The frame defines an opening through which the frame is slidably received over the tie shaft of the gas turbine engine when the modular fan is installed in the gas turbine engine. The modular fan additionally includes an attachment member for removably attaching the frame of the modular fan to the tie shaft of the gas turbine engine when the modular fan is installed in the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
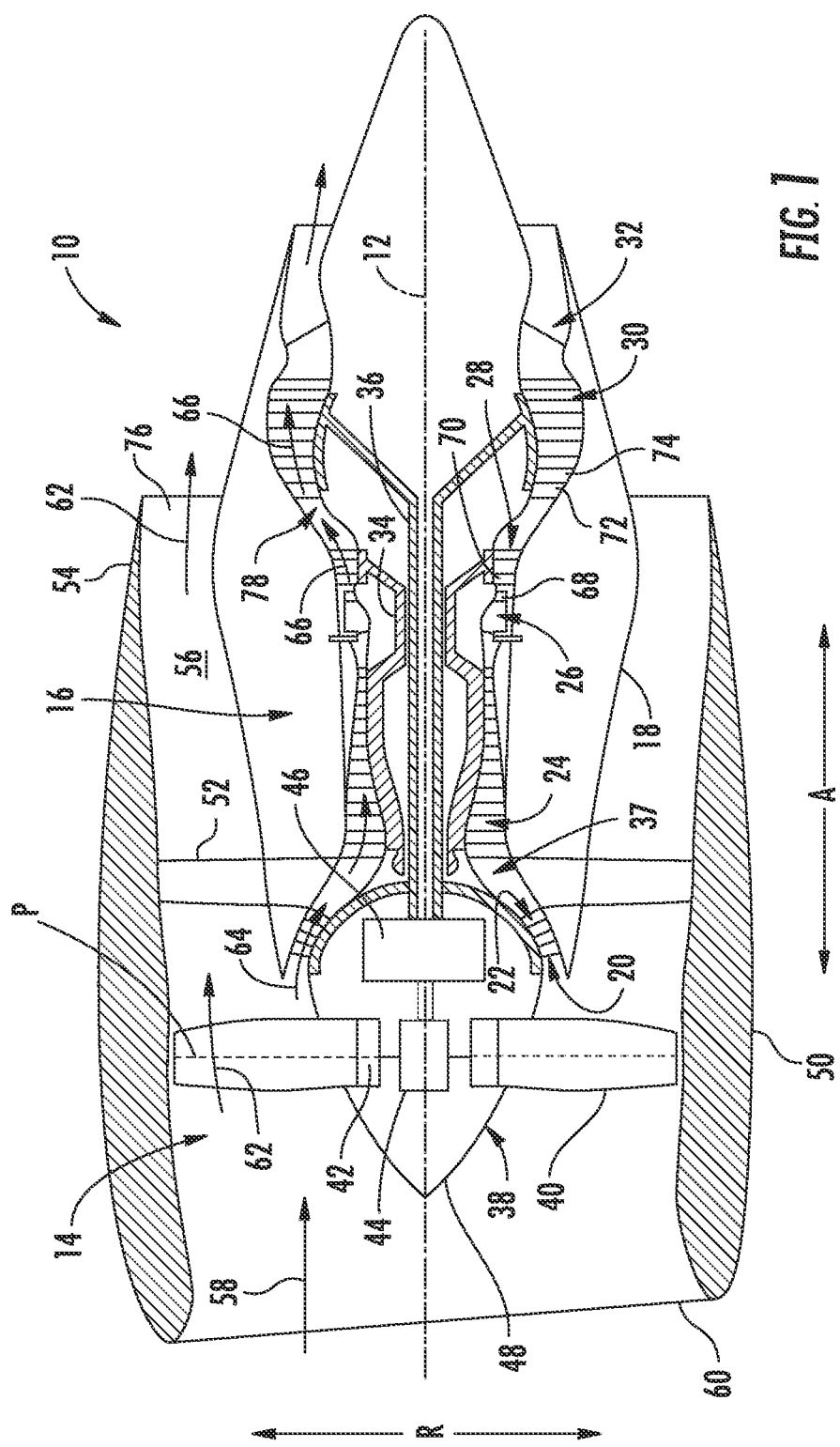
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine.

Figure 2:
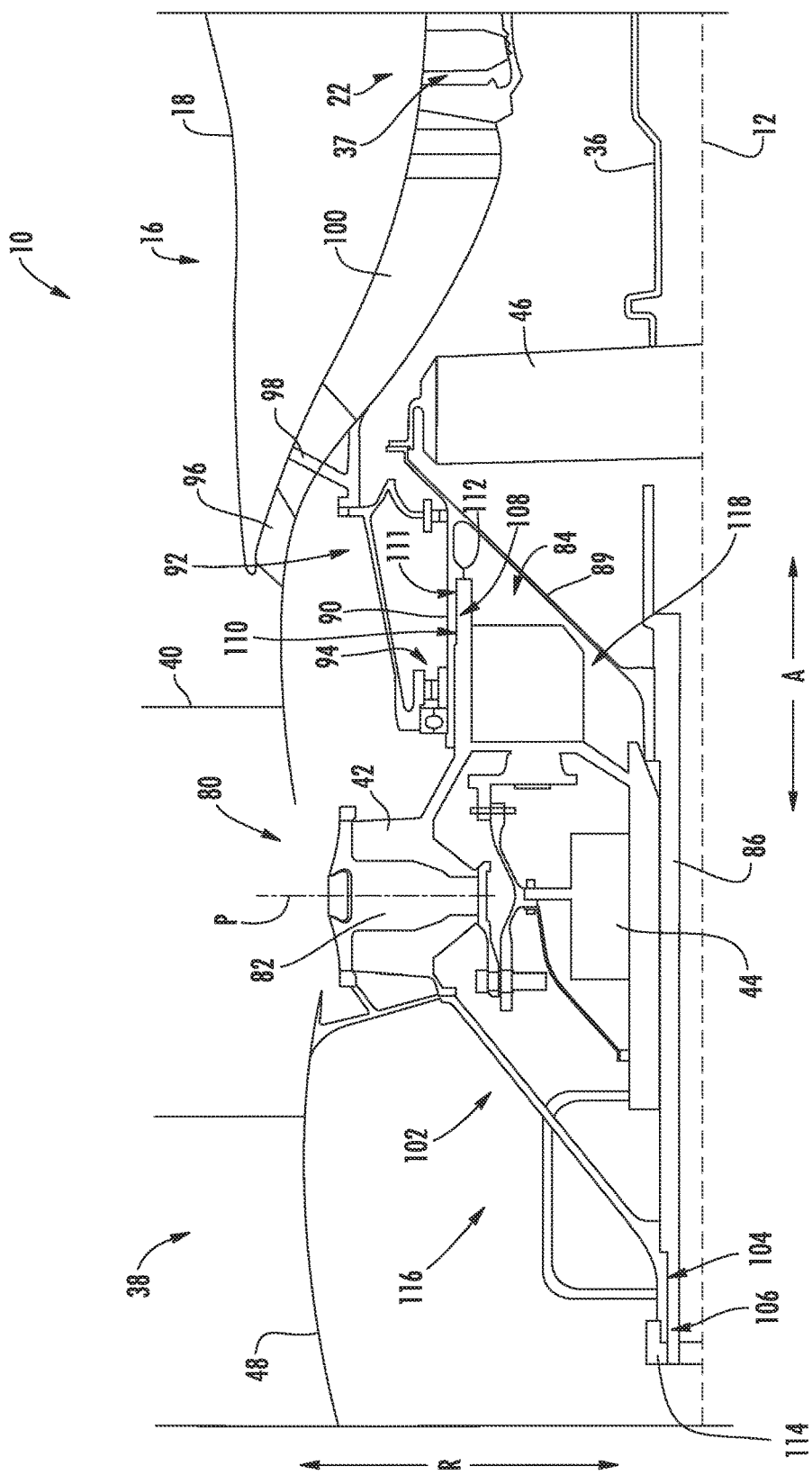
FIG. 2 is a schematic, cross-sectional view of a forward end of a gas turbine engine in accordance with another exemplary embodiment of the present disclosure.

Referring now to FIG. 2, a schematic, cross-sectional view of a forward end of a turbofan engine 10 in accordance with an exemplary embodiment of the present disclosure is provided. In at least certain example embodiments, the exemplary turbofan engine 10 depicted in FIG. 2 may be configured in substantially the same manner as the exemplary turbofan engine 10 described above with reference to FIG. 1. Accordingly, the same or similar numbering may refer to the same or similar part.

As depicted in FIG. 2, the turbofan engine 10 generally includes a modular fan 38 having a plurality of fan blades 40, each of the plurality of fan blades 40 attached to a disk 42. More specifically, each fan blade 40 defines a base 80 at an inner end along a radial direction R. Each fan blade 40 is coupled at the base 80 to the disk 42 via a respective trunnion mechanism 82. For the embodiment depicted, the base 80 is configured as a dovetail received within a correspondingly shaped dovetail slot of the trunnion mechanism 82. However, in other exemplary embodiments, the base 40 may be attached to the trunnion mechanism 82 in any other suitable manner. For example, the base 40 may be attached to the trunnion mechanism 82 using a pinned connection, or any other suitable connection. Notably, the trunnion mechanism 82 facilitates rotation of a respective fan blade 40 about a pitch axis P of the respective fan blades 40.

Additionally, for the embodiment depicted, the exemplary modular fan 38 of the turbofan engine 10 includes a pitch change mechanism 44 for rotating each of the plurality of fan blades 40 about their respective pitch axes P. The pitch change mechanism 44 may generally include one or more rotary actuators, a unison ring, etc. to facilitate rotation of the plurality of fan blades 40 about their respective pitch axes P. Moreover, the exemplary modular fan 38 includes a plurality of counterweights 84 to, e.g., ensure the fan 38 is balanced during operation. It should be appreciated, however, that in other exemplary embodiments, the exemplary fan 38 may include any other suitable configuration/pitch change mechanism 44 for changing the pitch of the plurality of fan blades 40. For example, although the exemplary pitch change mechanism 44 depicted includes one or more rotary actuators, in other exemplary embodiments, the pitch change mechanism 44 may instead include one or more linear actuators, or any other suitable mechanism.

Further, as with the exemplary turbofan engine 10 of FIG. 1, the modular fan 38 of the exemplary turbofan engine 10 depicted in FIG. 2 is, when installed in the turbofan engine 10, mechanically coupled to a core 16. More particularly, the turbofan engine 10 includes a tie shaft 86 extending along the axial direction A. As will be discussed in greater detail below, the modular fan 38 is coupled to the tie shaft 86 when installed in the turbofan engine 10. Additionally, the tie shaft 86 is, in turn, rotatable about the axial direction A by a turbine-driven shaft of the core 16. More particularly, the tie shaft 86 is mechanically coupled to the turbine-driven shaft through a power gearbox 46 (and through a structural arm 89 coupling the tie shaft 86 and power gearbox 46, for the embodiment depicted). In at least certain example embodiments, the turbine-driven shaft may be an LP shaft 36 of the turbofan engine 10.

Referring still to FIG. 2, the turbofan engine 10 additionally includes a structural member 90 spaced from the tie shaft 86 along a radial direction R of the turbofan engine 10. The structural member 90 is rotatable with the tie shaft 86, and more particularly is rigidly attached to the tie shaft 86 through the structural arm 89. Accordingly, the structural member 90 is also mechanically coupled to the turbine-driven shaft through the power gearbox 46.

The structural member 90 for the embodiment depicted is supported by a stationary frame assembly 92 through one or more fan bearings 94. The frame assembly 92 is connected through a core air flowpath 37 to the core 16, such as an outer casing 18 of the core 16. For the embodiment depicted, the core 16 includes a forward vane 96 and a strut 98, each providing structural support between the outer casing 18 of the core 16 and the frame assembly 92. Additionally, the LP compressor 22 includes an inlet guide vane 100. The forward vane 96, strut 98, and inlet guide vane 100 may additionally be configured to condition and direct the portion of the flow of air over the fan 38 provided to the core air flowpath 37 to, e.g., increase an efficiency of the compressor section.

Additionally, for the embodiment depicted, the one or more fan bearings 94 includes a forward ball bearing and two roller bearings located aft of the forward ball bearing. However, in other exemplary embodiments, any other suitable number and/or type of bearings may be provided for supporting rotation of the modular fan 38, as well as the tie shaft 86 and structural member 90. For example, in other exemplary embodiments, the one or more fan bearings 94 may include a pair (two) tapered roller bearings, or any other suitable bearings.

Figure 3:
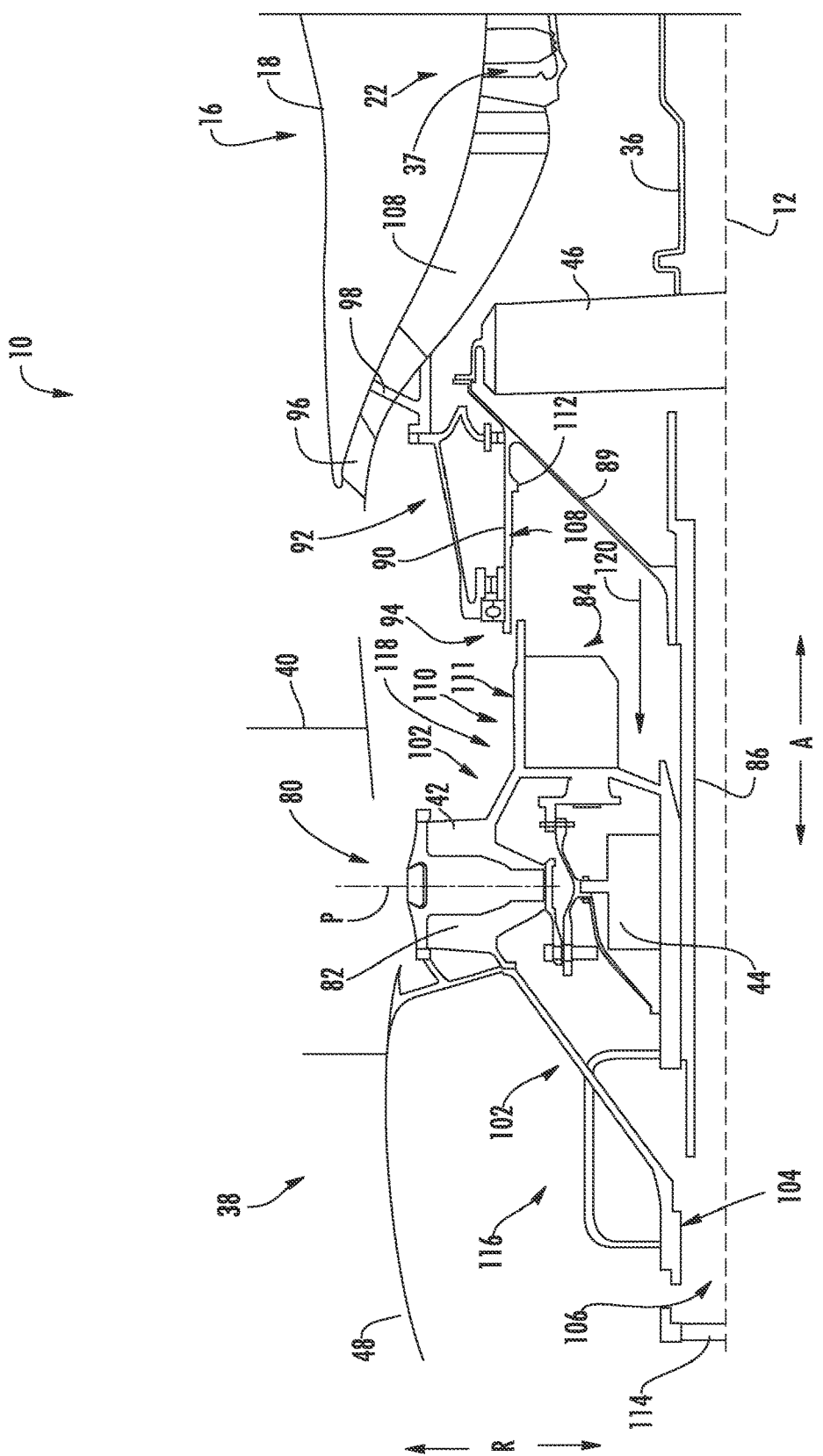
FIG. 3 is a schematic, cross-sectional view of the forward end of the exemplary gas turbine engine of FIG. 2, wherein a fan of the exemplary gas turbine engine is partially uninstalled.

Referring now also to FIG. 3, the modular fan 38 is removably installed in the turbofan engine 10. FIG. 3 depicts the forward end of the exemplary turbofan engine 10 of FIG. 2, wherein the modular fan 38 is partially removed. As depicted, the modular fan 38 generally includes a frame 102 slidably received on the tie shaft 86 along the axial direction A. Particularly for the embodiment depicted, the frame 102 includes an inner portion 104 along the radial direction R, and the inner portion 104 is slidably received on the tie shaft 86 along the axial direction A. For example, the frame 102, and more particularly, the inner portion 104 of the frame 102, defines an opening 106 through which the frame 102 is slidably received over the tie shaft 86 along the axial direction A.

Moreover, the exemplary structural member 90, which is rigidly attached to the tie shaft 86 through the structural arm 89, extends generally along the axial direction A and defines an inner surface 108 along the radial direction R. An aft portion 110 of the frame 102 of the modular fan 38 defines a corresponding outer surface 111 along the radial direction R. The outer surface 111 of the aft portion 110 of the frame 102 slidably interfaces with the inner surface 108 of the structural member 90 along the axial direction A. Additionally, the structural member 90 includes a lip 112 on the inner surface 108 such that when the modular fan 38 is installed in the turbofan engine 10, the aft portion 110 of the frame 102 of the modular fan 38 abuts the lip 112 on the inner surface of the structural member 90.

Notably, although the frame 102 is slidable relative to the tie shaft 86 and structural member 90 along the axial direction A, the frame 102 may be fixed to the tie shaft 86 and/or structural member 90 along a circumferential direction (i.e., a direction extending around an axial centerline 12 of the turbofan engine 10, not depicted). Specifically, the frame 102 may be fixed to the tie shaft 86 and/or structural member 90 along the circumferential direction, such that rotation of the tie shaft 86 and structural member 90 correspondingly rotates the frame 102. The frame 102, tie shaft 86, and/or structural member 90 may define any suitable configuration for fixing such components along the circumferential direction. For example, the tie shaft 86 and opening 106 defined by the frame 102 may define a corresponding non-circular shape, and/or the inner surface 108 of the structural member 90 and aft portion 110 of the frame 102 may define a corresponding non-circular shape. Alternatively, however, the frame 102 may be fixed to the tie shaft 86 and/or structural member 90 by friction between, e.g., an attachment member 114 (discussed below) and the lip 112 of the structural member 90.

Further, as previously discussed, the exemplary modular fan 38 includes the pitch change mechanism 44 for rotating the plurality fan blades 40, the disk 42 to which the plurality of fan blades 40 are attached, and the one or more fan counterweights 84 to ensure balanced rotation of the fan 38. For the embodiment depicted, the frame 102 of the modular fan 38 includes the pitch change mechanism 44, the disk 42, and the one or more fan counterweights 84 attached thereto, or integrated therein. More specifically, for the embodiment depicted, the disk 42 is configured as a portion of the frame 102, the one or more fan 38 counterweights 84 are also configured as a portion of the frame 102, and the pitch change mechanism 44 is also configured as a portion of the frame 102.

Figure 4:
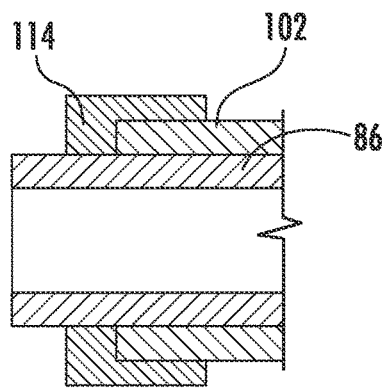
FIG. 4 is a close-up, cross-sectional view of a frame of a fan and a forward end of a tie shaft, each of a gas turbine engine in accordance with another exemplary embodiment of the present disclosure.

Referring now also to FIG. 4, providing a close-up, cross-sectional view of a forward end of the tie shaft 86 and frame 102, the modular fan 38 additionally includes an attachment member 114 for removably attaching the frame 102 of the modular fan 38 to the tie shaft 86 of the turbofan engine 10 to removably install the modular fan 38 in the turbofan engine 10. As is depicted, the frame 102 of the modular fan 38 generally defines a forward side 116 and an aft side 118. The attachment member 114 for the embodiment depicted removably attaches the frame 102 of the modular fan 38 to the tie shaft 86 at the forward side 116 of the modular fan 38. Notably, the attachment member 114 may be any suitable attachment member 114 for removably attaching the frame 102 of the modular fan 38 to the tie shaft 86. In certain exemplary embodiments, such as the embodiment depicted, the attachment member 114 may be configured as a nut threadably engaged to the tie shaft 86 and configured to press the frame 102 of the modular fan 38 aftwardly generally along the axial direction A when engaged to the tie shaft 86. More specifically, the nut may press the modular fan 38 in an aft direction along the axial direction A such that the modular fan 38 is pressed between the nut and the lip 112 on the inner surface 108 of the structural member 90. Notably, in certain exemplary embodiments, the attachment member 114 may define an aftward pressing force $F_1$ on the frame 102 of the fan 38. The aftward pressing force $F_1$ of the attachment member 114 may be larger than a maximum amount of thrust $F_2$ generated by the fan 38 during operation. Specifically, a ratio of the aftward pressing force $F_1$ to the maximum amount of thrust $F_2$ may be at least about 1.1:1, such as at least about 1.2:1, at least about 1.5:1, at least about 1.7:1, or at least about 2:1.

Figure 5:
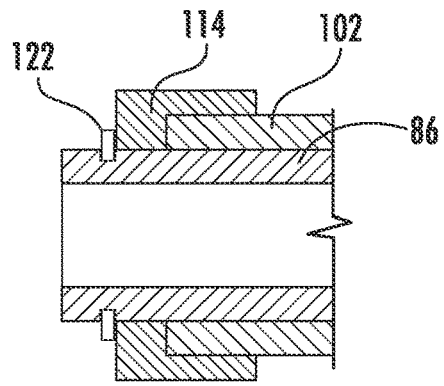
FIG. 5 is a close-up, cross-sectional view of a frame of a fan and a forward end of a tie shaft, each of a gas turbine engine in accordance with yet another exemplary embodiment of the present disclosure.
Figure 6:
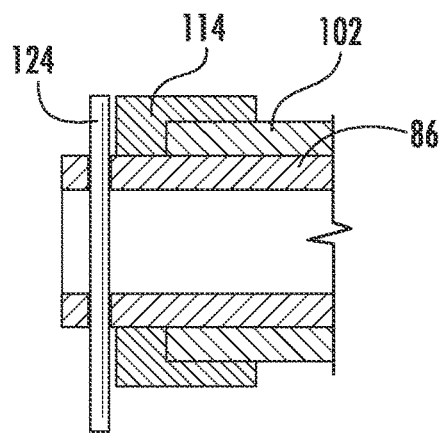
FIG. 6 is a close-up, cross-sectional view of a frame of a fan and a forward end of a tie shaft, each of a gas turbine engine in accordance with still another exemplary embodiment of the present disclosure.

It should be appreciated, however, that in other exemplary embodiments, the attachment member 114 may be any other suitable device for releasably coupling the frame 102 of the modular fan 38 to the tie shaft 86. For example, in other exemplary embodiments, the attachment member 114 may be a pin or bolt slidably received through an opening extending through the frame 102 and tie shaft 86 at the forward side 116 of the frame 102. Additionally, in still other exemplary embodiments, the fan 38 may include a secondary retention feature for, e.g., ensuring the attachment member 114 remains attached to the tie shaft 86. For example, referring now briefly to FIGS. 5 and 6, close-up, cross-sectional views of a forward end of a tie shaft 86 and a frame 102 in accordance with two other exemplary embodiments of the present disclosure are provided. For the embodiment of FIG. 5, the fan 38 additionally includes a snap ring 122 attached to the tie shaft 86 forward of the attachment member 114 (e.g., nut) to prevent the attachment member 114 from unintentionally being removed. Additionally, for the embodiment of FIG. 6, the fan 38 additionally includes a pin 124 extending through an opening in the tie shaft 86 forward of the attachment member 114 (e.g., nut) also to prevent the attachment member 114 from unintentionally being removed.

Referring now particularly to FIG. 3, the exemplary modular fan 38 of FIG. 2 is depicted with the attachment member 114 removed and the modular fan 38 partially uninstalled from the turbofan engine 10. As shown, modular fan 38 may be removed as a single module or unit from the turbofan engine 10 by removing the attachment member 114 and sliding the frame 102 of the turbofan engine 10 forward along the axial direction A, as indicated by arrow 120. Such a configuration allows for the modular fan 38 to be installed and removed from the turbofan engine 10 as a single module. Additionally, the modular fan 38 may be installed within the turbofan engine 10 with relative ease, by simply sliding the fan 38, preassembled as a single fan module, onto the tie shaft 86 and within the structural member 90 and fixing the modular fan 38 in position by tightening the attachment member 114 from the forward side 116 of the modular fan 38.

Figure 7:
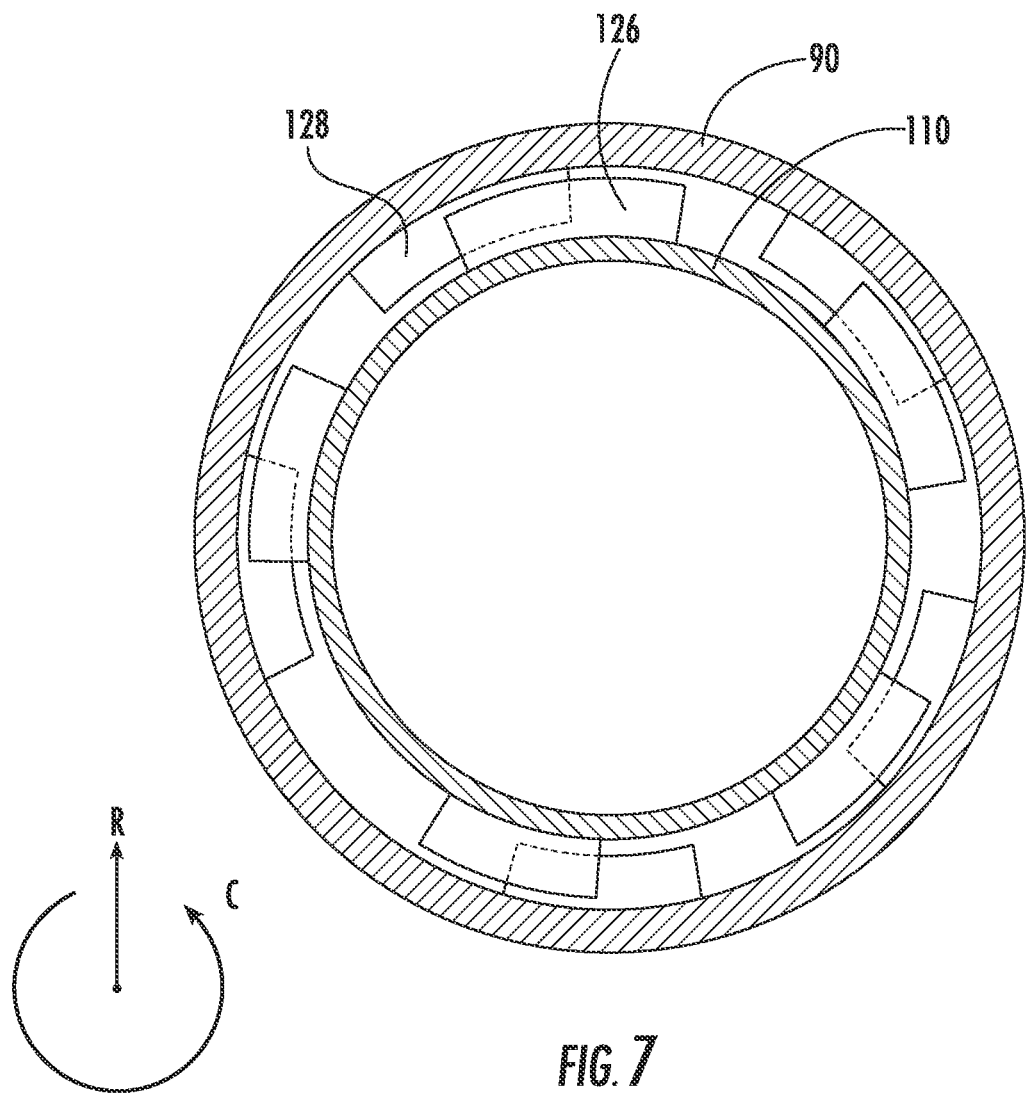
FIG. 7 provides a cross-sectional view of a structural member and a frame of a fan, each of a gas turbine engine in accordance with yet another exemplary embodiment of the present disclosure.

It should be appreciated, however, that in other exemplary embodiments, the modular fan 38 and/or turbofan engine 10 may have any other suitable configuration. For example, in other exemplary embodiments, the frame 102 of the exemplary modular fan 38 may not include all of the components depicted in FIGS. 2 and 3 attached thereto or integrated therein. Additionally, or alternatively, in other exemplary embodiments, the frame 102 of the exemplary modular fan 38 may additionally include components not depicted in FIGS. 2 and 3 and/or not described herein. For example, in still other exemplary embodiments, the fan 38 may include a supplemental attachment means for installing the modular fan 38 in the turbofan engine 10. For example, the aft portion 110 of the frame 102 may be configured as a supplemental attachment feature attaching the frame 102 of the fan 38 to, e.g., the structural member 90. Specifically, referring briefly to FIG. 7, providing a cross-sectional view of the frame 102 and structural member 90 in accordance with an exemplary embodiment of the present disclosure, the aft portion 110 of the frame 102 may include features for attaching the aft portion 110 of the frame 102 to the structural member 90 to prevent the modular fan 38 from coming uninstalled in the event of a failure of the tie shaft 86. Particularly for the embodiment depicted, the aft portion 110 of the frame 102 includes a plurality of teeth 126 extending outward along the radial direction R. Additionally, the structural member 90 includes a plurality of teeth 128 extending inwardly along the radial direction R. When the fan 38 is installed, the teeth 126 of the aft portion 110 are positioned aft of the teeth 128 of the structural member 90, and misaligned with the teeth 128 of the structural member 90 such that the fan 38 is locked into place.

Further, it should be appreciated that although for the embodiment of FIGS. 2 and 3, the turbofan engine is configured as a geared, variable pitch fan turbofan engine, in other exemplary embodiments, aspects of the present disclosure may be incorporated into any other suitable turbofan engine and/or any other suitable gas turbine engine (such as a turboprop engine).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. It will be appreciated, that when the definite article "said" is used in the claims prior to an element, such use is to differentiate claimed elements from environmental elements identified by the definite article "the" and not included within the claimed subject matter. Additionally, for claims not including the definite article "said", the definite article "the" is used to identify claimed elements.

What is claimed is:
1. A gas turbine engine defining a radial direction and an axial direction, the gas turbine engine comprising:
a core;
a tie shaft rotatable about the axial direction in the core;

a structural member spaced radially outward from the tie shaft along the radial direction and defining an inner surface; and a modular fan comprising
a disk having a forward side and an aft side;
a plurality of fan blades attached to the disk;
a frame, the frame attached to or formed integrally with the disk, the frame including a forward side section and an aft side section, the aft side section including a radial extension member extending from the aft side of the disk and an aft extension member extending from the radial extension member and located aft of the disk, and the forward side section of the frame slidably received on the tie shaft of the gas turbine engine, and wherein a portion of the aft extension member of the frame slidably interfaces with the inner surface of the structural member; and
an attachment member removably attaching the frame of the modular fan to the tie shaft of the gas turbine engine to removably install the modular fan in the gas turbine engine.

2. The gas turbine engine of claim 1, wherein the forward side section of the frame defines an opening, and wherein the forward side section of the frame is slidably received on the tie shaft through the opening.

3. The gas turbine engine, of claim 1, wherein the plurality of fan blades each define a pitch axis, wherein the modular fan further comprises a pitch change mechanism for rotating the plurality of fan blades about their respective the pitch axis, and wherein the pitch change mechanism is attached to or integrated into the frame of the modular fan.

4. The gas turbine engine of claim 1, wherein the modular fan further comprises one or more fan counterweights, and wherein the one or more fan counterweights are attached to or integrated into the frame of the modular fan.

5. The gas turbine engine of claim 1, wherein the structural member includes a lip on the inner surface, and wherein the aft extension member of the modular fan abuts the lip on the inner surface of the structural member.

6. The gas turbine engine of claim 1, wherein the structural member is rotatable with the tie shaft of the gas turbine engine.

7. The gas turbine engine of claim 1, wherein the structural member is supported by a stationary frame through one or more bearings.

8. The gas turbine engine of claim 1, wherein the gas turbine engine further comprises a power gearbox, wherein the core comprises a turbine-driven shaft, and wherein the tie shaft is mechanically coupled to the turbine-driven shaft through the power gearbox.

9. The gas turbine engine of claim 1, wherein the attachment member removably attaches the forward side section of the frame of the modular fan to the tie shaft.

10. The gas turbine engine of claim 1, wherein the attachment member is a nut threadably engaged to the tie shaft, the nut configured to press the frame of the modular fan aftwardly generally along the axial direction when engaged to the tie shaft.

11. The gas turbine engine of claim 1, wherein the tie shaft extends along the axial direction, and wherein the tie shaft is positioned at least partially forward of the core.

12. The gas turbine engine of claim 1, wherein the attachment member defines an aftward pressing force, wherein the modular fan is configured to produce a maximum amount of thrust during operation, and wherein a ratio of the aftward pressing force of the attachment member to the maximum amount of thrust of the modular fan is at least about 1.1:1.

13. The gas turbine engine of claim 1, wherein the gas turbine engine further comprises a power gearbox, wherein the core comprises a turbine-driven shaft, and wherein the tie shaft is mechanically coupled to the turbine-driven shaft through the power gearbox and a structural arm extending between the power gearbox and the tie shaft, and wherein the structural member extends from the structural arm in the axial direction.

14. The gas turbine engine of claim 1, wherein the forward side section of the frame is attached to or formed integrally with the disk at the forward side of the disk, and wherein the aft side section of the frame is attached to or formed integrally with the disk at the aft side of the disk.

15. The gas turbine engine of claim 1, wherein the radial extension member of the aft side section of the frame slidably interfaces with the inner surface of the structural member.

16. A modular fan for a gas turbine engine defining an axial direction, the gas turbine engine including a core and a tie shaft, the tie shaft rotatable about the axial direction in the core, the modular fan comprising:
a plurality of fan blades;
a disk having a forward side and an aft side, said plurality of fan blades attached to said disk;
a frame, said disk attached to or integrated into said frame, said frame including a forward side section and an aft side section, said aft side section including a radial extension member extending from the aft side of said disk and an aft extension member extending from the radial extension member and located aft of said disk, said forward side section of said frame defining an opening through which said forward side section of said frame is slidably received over the tie shaft of the gas turbine engine when said modular fan is installed in the gas turbine engine, wherein the aft extension member of said frame comprises an outer surface for slidably interfacing with a structural member of the gas turbine engine spaced radially outward of the tie shaft when said modular fan is installed in the gas turbine engine; and
an attachment member for removably attaching said frame of said modular fan to the tie shalt of the gas turbine engine when said modular fan is installed in the gas turbine engine.

17. The modular fan of claim 16, wherein said plurality of fan blades each define a pitch axis, wherein said modular fan further comprises a pitch change mechanism for rotating said plurality of fan blades about their respective the pitch axis, and wherein said pitch change mechanism is attached to or integrated into said frame of said modular fan.

18. The modular fan of claim 16, wherein said attachment member is a nut for threadably engaging the tie shaft and pressing said frame of said modular fan aftwardly generally along the axial direction when said modular fan is installed in the gas turbine engine.

19. The gas turbine engine of claim 1, wherein the forward side section is positioned forward of the disk and is slidably received on the tie shaft of the gas turbine engine, and wherein the frame is fixed to the structural member along a circumferential direction of the gas turbine engine.

* * * * *